United States Patent [19]  [11] 4,324,604
Alexander et al.  [45] Apr. 13, 1982

[54] BEAD SETTING APPARATUS WITH RETRACTABLE FLANGE

[75] Inventors: Joseph H. Alexander, Kent; Frank R. Jellison, Canton, both of Ohio

[73] Assignee: The General Tire & Rubber Co., Akron, Ohio

[21] Appl. No.: 972,317

[22] Filed: Dec. 22, 1978

[51] Int. Cl.³ .......................................... B29H 17/22
[52] U.S. Cl. .................................. 156/131; 156/401; 156/403; 156/417
[58] Field of Search ................. 156/123 R, 131, 132, 156/133, 394 R, 398–403, 415, 417

[56] References Cited

U.S. PATENT DOCUMENTS

| 1,921,579 | 8/1933 | Otto | 156/403 |
| 2,605,198 | 7/1952 | Haase | 156/132 |
| 2,814,331 | 11/1957 | Vanzo et al. | 156/131 |
| 3,871,942 | 3/1975 | Henley et al. | 156/403 |
| 3,950,212 | 4/1976 | Bullmann | 156/131 |

FOREIGN PATENT DOCUMENTS 787614 12/1957 United Kingdom ................ 156/403

Primary Examiner—John E. Kittle

[57] ABSTRACT

An apparatus and method of setting a bead ring against the plies of a tire carcass on the shoulder of a building drum includes a carrier member with a retractable bead support flange. As the carrier member pushes the bead firmly against the carcass plies, the bead support flange is also pushed against the carcass plies, and the flange partly retracts under the pressure. Then, a fluid operated piston drives the support flange further away from the carcass plies, leaving the bead ring almost unsupported, but pressed firmly against the carcass plies on the building drum. The carrier member then retracts away from the building drum, leaving the bead ring in place on the building drum shoulder and ready to have the carcass ply end portions wrapped around it.

3 Claims, 10 Drawing Figures

BEAD SETTING APPARATUS WITH RETRACTABLE FLANGE

FIELD OF THE INVENTION

This invention relates to the art of building pneumatic tires, and more particularly to an improved apparatus and method of setting a bead ring against the plies of a tire carcass that overhang the shoulder of a building drum.

BACKGROUND OF THE INVENTION

One apparatus and method of setting a bead ring against the plies of a tire carcass is shown in U.S. Pat. No. 3,871,942 to V. E. Henley et al., assigned to the assignee of the present invention. The bead setting apparatus of that patent, shown in FIG. 7 and described in column 6, lines 49 to 66, has a thin cylindrical flange on which the bead ring is supported before it is pushed against the carcass plies on the drum shoulder by a radially extending plate located behind the bead ring. Since the supporting cylindrical flange extends only part way within the inside edge surface of the bead ring, this flange does not touch the carcass plies or the drum shoulder, or otherwise interfere with the bead setting apparatus as it drives the bead ring against the carcass plies.

However, in order to obtain a tight wrapping of the carcass plies around the building drum shoulder during the expansion of the drum and the subsequent setting of the bead ring, it has been found desireable to lengthen the cylindrical flange of the bead setting apparatus. With such a longer flange, extending fully across the inside surface of the bead ring and protruding toward the shoulder of the building drum, the bead setting apparatus is moved in close to the drum during its expansion. With the apparatus so positioned, the carcass plies will be forced laterally around the drum facing edge of the long flange as they are pulled radially outwardly by the expanding drum. These plies will thus be wrapped more tightly against the shoudler of the drum and will conform more to the contour of the shoulder, thus insuring better cord length control.

While a long bead carrying flange helps in wrapping the carcass plies around the drum shoulder, it makes the actual setting of the bead ring more difficult. In the past, an inflatable push-off bladder has been used to push the bead ring off its long flange and against the carcass plies on the shoulder of the building drum. Such a bladder, however, cannot provide the required force to push the bead ring off the long cylindrical flange when the bead ring fits snugly over the flange. On the other hand, when the bead ring fits loosely on the flange, it is likely to become canted and positioned off center when it is seated against the carcass plies on the building drum. The push-off bladder itself can also contribute to the improper and insecure positioning of the bead ring, because it does not present a solid back-up surface for the bead ring and does not push hard enough on the bead ring, especially during the final stages of the bead setting.

SUMMARY OF THE INVENTION

The foregoing problems in setting a bead ring against the plies of a tire carcass are overcome by an improved apparatus that includes an annular carrier member encircling the axis of a tire building drum, bead ring support flange encircling the building drum axis and mounted on the carrier member and extending axially from the carrier member toward the tire building drum shoulder, and means for moving the carrier member axially toward the tire building drum shoulder. The improvement resides in a bead ring support flange that is axially slidable with respect to the carrier member, and in the means for sliding this bead ring support flange with respect to the carrier member in a direction axially away from the tire building drum. Preferably, the means for sliding the support flange is a fluid operated annular piston slidable within an annular chamber in the carrier member.

The invention also resides in an improved method that includes the steps of carrying the bead ring on the support flange of a carrier member to a first position spaced axially from the building drum shoulder, and then expanding the building drum to cause the end portions of carcass plies on the drum to be drawn around the drum facing edge of the support flange and toward the end face of the building drum. The improvement resides in the steps of moving the carrier member further toward the drum from its first position to press the bead ring and the support flange against the carcass ply end portions and also to press the carcass ply end portions against the end face of the building drum; sliding the support flange on the bead ring carrier member axially away from the tire building drum to release the hold that the carrier member has on the bead ring; and then moving the carrier member axially away from the tire building drum, leaving the bead ring pressed against the end portions of the carcass plies overhanging the building drum shoulder. Preferably, the bead ring support flange slides on the carrier member axially away from the tire building drum a short distance as the result of the forward movement of the carrier member toward the building drum which presses the support flange against the carcass plies, and then the support flange is slid further away from the tire building drum by a fluid operated piston or other movement means independent of the means that moves the bead ring carrier member.

An object of the foregoing improved bead setting method and apparatus is to provide a tire bead ring set firmly, concentrically, and squarely against the carcass ply end portions overhanging the building drum shoulder.

Another object of the invention is to provide a firm and accurate setting of the bead ring while at the same time insuring that the carcass ply ends are wrapped tightly around the drum shoulder and conforming to the contour of the soulder. This insures a square and concentric setting of the bead with respect to the outside diameter of the drum. Since the drum supports the ply, this insures a square and concentric setting.

These and other objects, advantages, and features of the invention will be more apparent from the attached drawings and the following detailed description of a preferred embodiment of the invention.

DESCRIPTION OF A PREFERRED EMBODIMENT

Figure 1:
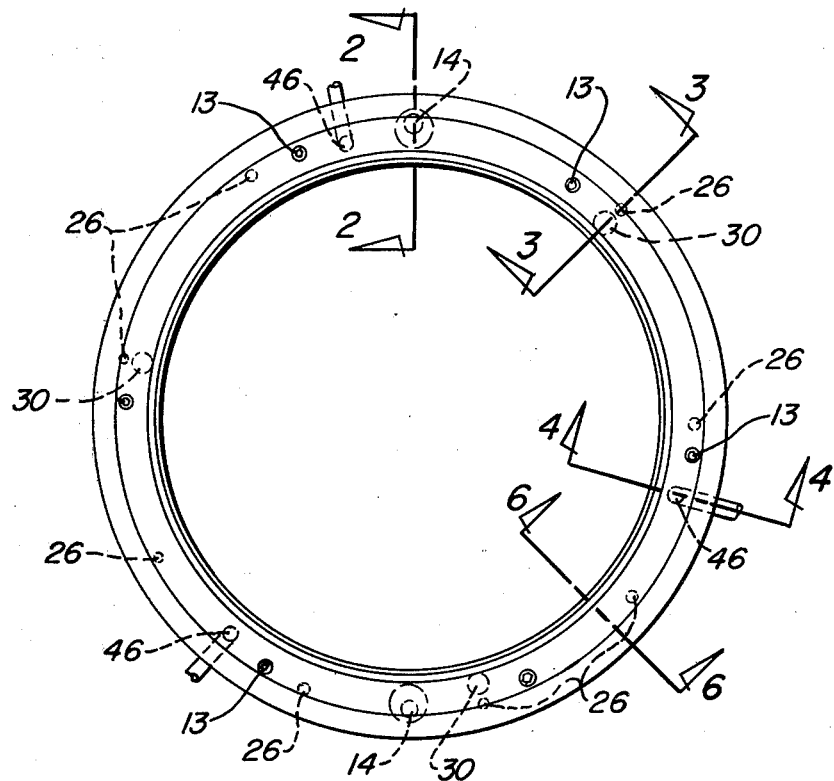
FIG. 1 is an end view of a bead setting apparatus as seen from the building drum, this apparatus representing one embodiment of the present invention.
Figure 2:
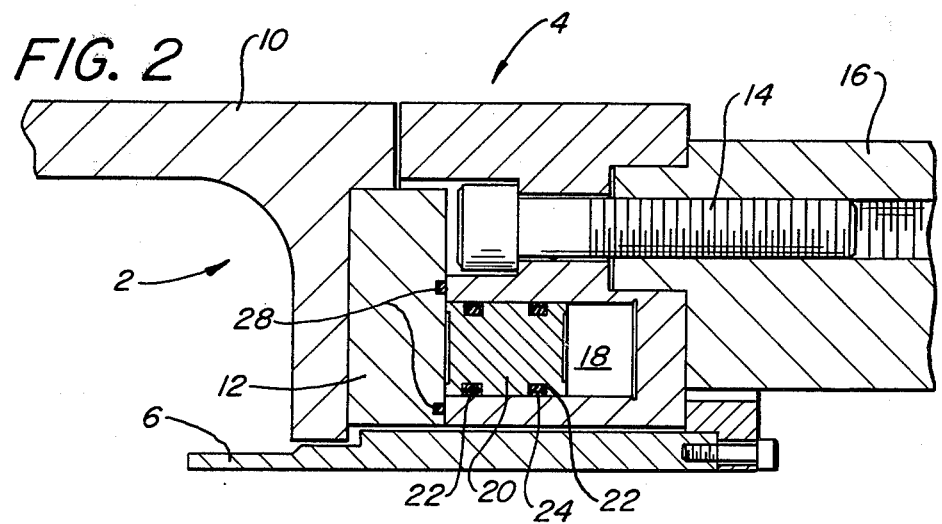
FIG. 2 is an enlarged sectional view of the bead setting apparatus of FIG. 1, taken along line 1—1 of FIG. 1.
Figure 3:
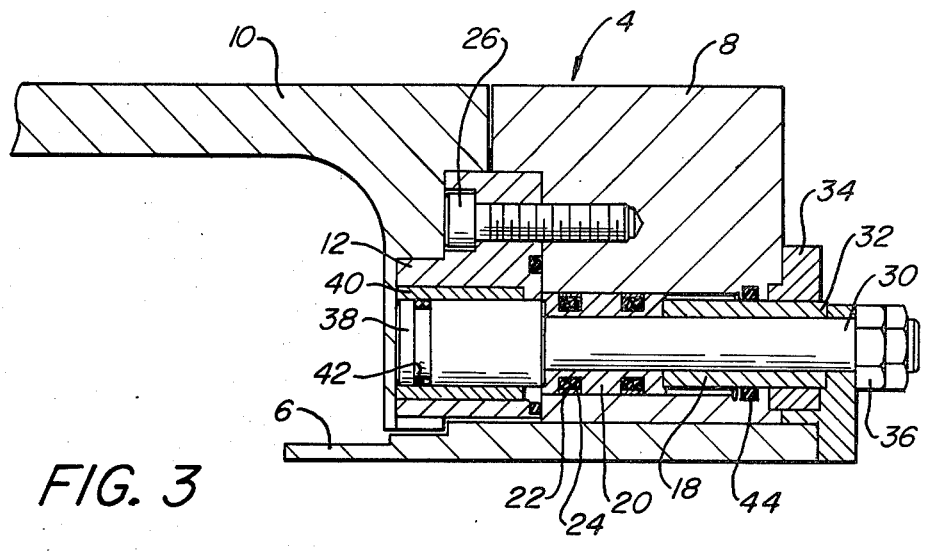
FIG. 3 is another enlarged sectional view of the bead setting apparatus of FIG. 1, taken along line 2—2 of FIG. 1.
Figure 4:
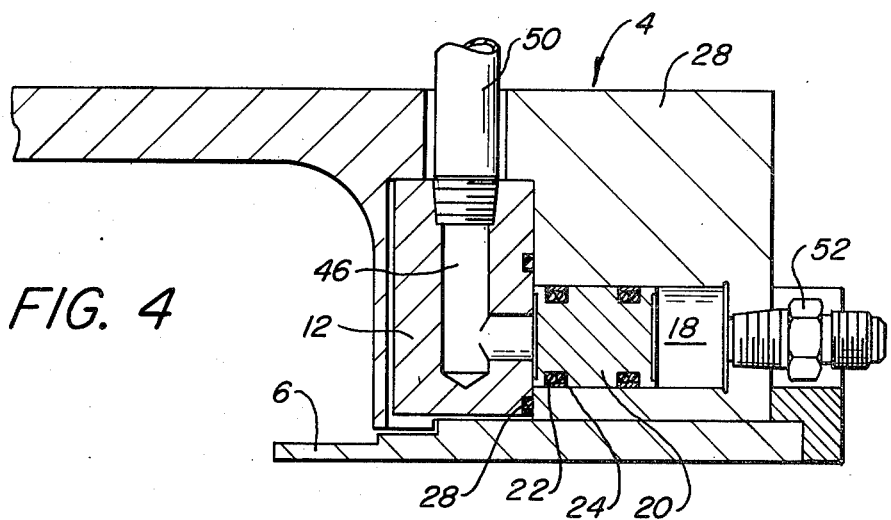
FIG. 4 is yet another enlarged sectional view of the bead setting apparatus of FIG. 1, taken along line 3—3 of FIG. 1.

As best seen in the sectional views of FIGS. 2, 3 and 4, the bead setting apparatus 2 includes an annular carrier member 4 and a cylindrical bead ring support flange 6. The carrier member 4 is in turn made of several parts including a main body ring 8, a front ring member 10, and a chamber cover plate 12. Machine screws 13 (FIG. 1) secure the front ring member 10 to the chamber cover plate 12.

As shown in FIG. 2, a machine screw 14 secures the main body ring 8 to a carrier member support beam 16. There are two such machine screws 14 and support beams 16 at diametrically opposed locations on the circumference of the bead setting apparatus, as illustrated in FIG. 1 by the dotted-line heads of machine screws 14.

An annulus-shaped chamber 18 extends circumferentially around the main body ring 8 and houses an annular piston 20. Compressible O-rings 22 and teflon-filled bronze rings 24 are housed within grooves in the sides of the piston 20, providing an airtight, sealed engagement between the piston 20 and the walls of chamber 18. The left-hand end of chamber 18, as viewed in FIGS. 2, 3, and 4, is closed off by the chamber cover plate 12, secured to the main body ring 8 by machine screws 26 (FIG. 3), which are disposed at a plurality of locations around the circumference of the bead setting apparatus, as indicated in FIG. 1. The connection between the cover plate 12 and the chamber 18 is sealed airtight by O-rings 28.

As shown in FIG. 3, the piston 20 is connected to the cylindrical flange 6 by rods 30, spaced at intervals around the circumference of the apparatus as indicated in FIG. 1. Each rod 30 is surrounded by a sleeve 32 that slides within a bearing member 34 mounted on the main body ring 8. Outside the bearing member 34, the rod 30 is connected by nuts 36 to the end of the cylindrical flange 6. On the other side of piston 20, the rod 30 has an enlarged head sliding with a bearing member 40 mounted on the cover plate 12. The head 38 keeps the rod 30 axially aligned with the opening in bearing member 34 and keeps it from jamming during its movement. O-ring seal 42 in the head 38 and an O-ring seal 44 surrounding the sleeve 32 keep the fluid in chamber 18 from leaking past either end of the rod 30.

The chamber cover plate 12 has several fluid passageways 46 located around its circumference, as shown in FIG. 1. As best seen in FIG. 4, each fluid passage-way 46 is connected to an air supply line 50, and the passage-way 46 directs air pressure from this supply line against the piston 20 in chamber 18. At the other end of chamber 18 on the other side of piston 20 is located an air supply fitting 52. The piston 20 is moved backward or forward in the chamber 18 to retract or extend the bead ring support flange 6 by either feeding pressurized air through air supply line 50 while using fitting 52 as a vent to the atmosphere, or conversely feeding pressurized air through fitting 52 and using the line 50 as a vent to the atmosphere.

Figure 5:
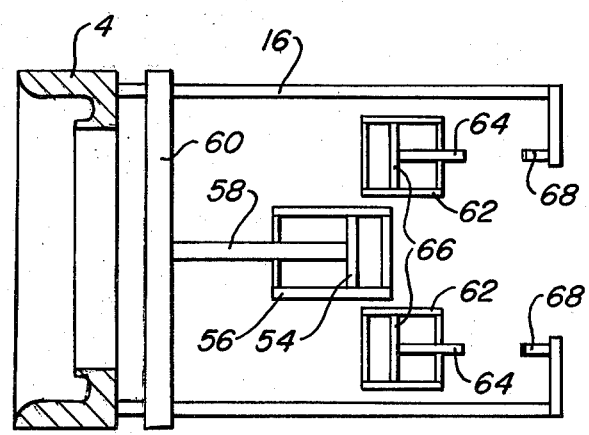
FIG. 5 is a schematic drawing of the fluid operated devices for moving the bead setting apparatus of FIG. 1 toward and away from its associated building drum.
Figure 6:
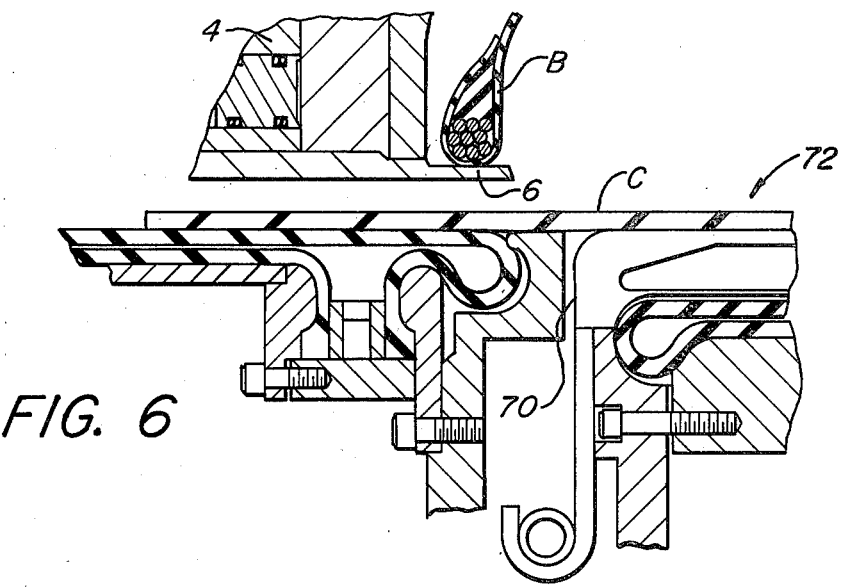
FIG. 6 is an enlarged sectional view of the bead setting apparatus of FIG. 1 taken along line 6—6 of FIG. 1, and showing the bead setting apparatus in a position adjacent a tire building drum just prior to the drum expanding to its bead ring receiving position.

To move the bead ring carrier member 4 toward and away from its associated tire building drum, there is provided a combination of pneumatic and hydraulic pressure cylinders, shown schematically in FIG. 5. Piston 54 in air cylinder 56 is connected by rod 58 to a cross-member 60, extending between the two support beams 16. Air presssure supplied to the cylinder 56 thus supplies the primary power to move the annular carrier member 4 toward or away from the building drum. The cylinders 62 are supplied with hydraulic fluid and rods 64 connected to the pistons 66 inside the cylinders 62 act as stops against pins 68 connected to the support beams 16. When the air pressure in cylinder 56 moves the carrier member 4 toward the building drum, the rods 64, backed by the hydraulic pressure in cylinders 62, engage the pins 68 and stop the carrier member 4 at a first position spaced a short distance away from the end of the building drum. Then, later when the carcass ply ends on the shoulder of the building drum are ready to receive the bead ring, the hydraulic pressure in the cylinders 62 is released, allowing the carrier member 4 to move in against the shoulder of the building drum for the purpose of setting the bead ring.

The operation of the bead setting apparatus 2 is illustrated in FIGS. 6 through 10. First, the carrier member 4 with its slidable flange 6 are moved by the above described pressure cylinders to a first position shown in FIG. 6. In this position the bead ring B is supported on flange 6 which is held fully extended from the carrier member 4 by air pressure in chamber 18 supplied through the fittings 52. Also, the carrier member 4 and flange 6 hold the bead ring B spaced axially a short distance from the end face 70 of building drum 72. The hydraulic pressure in cylinders 62 (FIG. 5) holds the carrier member 4 from further movement toward the building drum 72.

Figure 7:
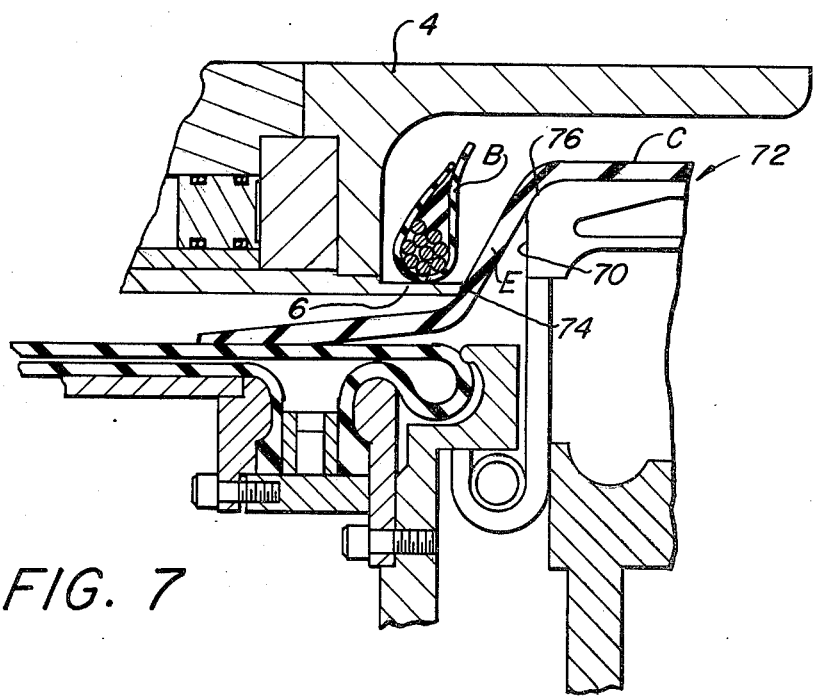
FIG. 7 is the same sectional view of the bead setting apparatus as FIG. 6, but showing the adjacent tire building drum expanded to its bead ring receiving position.

Then, the building drum 72 is expanded in diameter to a position shown in FIG. 7. During this expansion, the end portions E of carcass plies C on the building drum 72 are drawn around the drum facing edge 74 of the bead ring support flange 6 and toward the building drum end face 70. This action wraps the carcass ply ends E around building drum shoulder 76, so that the carcass plies conform to the shape of the shoulder.

Figure 8:
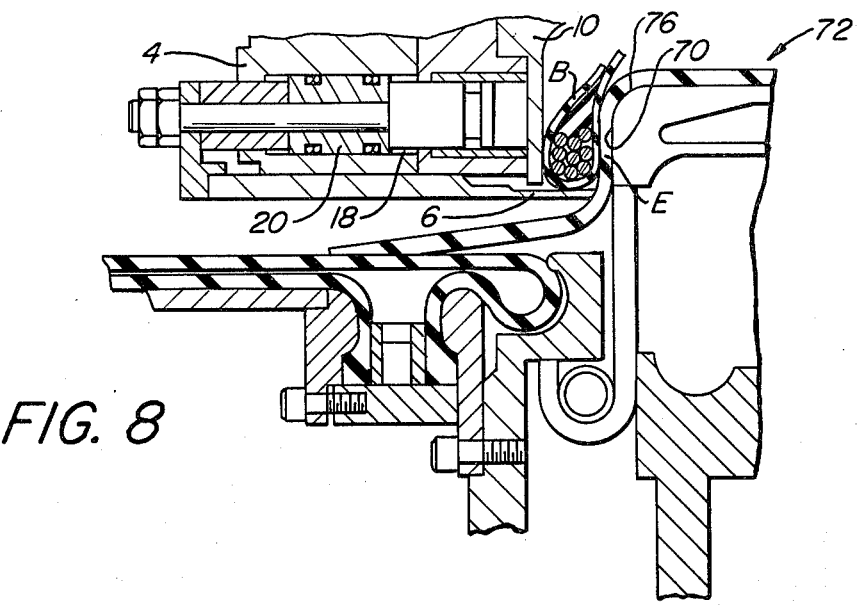
FIGS. 8 and 9 are enlarged sectional views of the bead setting apparatus of FIG. 1, taken along line 3—3 of FIG. 1, and showing the bead setting apparatus in two different positions while in the process of setting a bead ring against the carcass ply ends overhanging the shoulder of a tire building drum.
Figure 9:
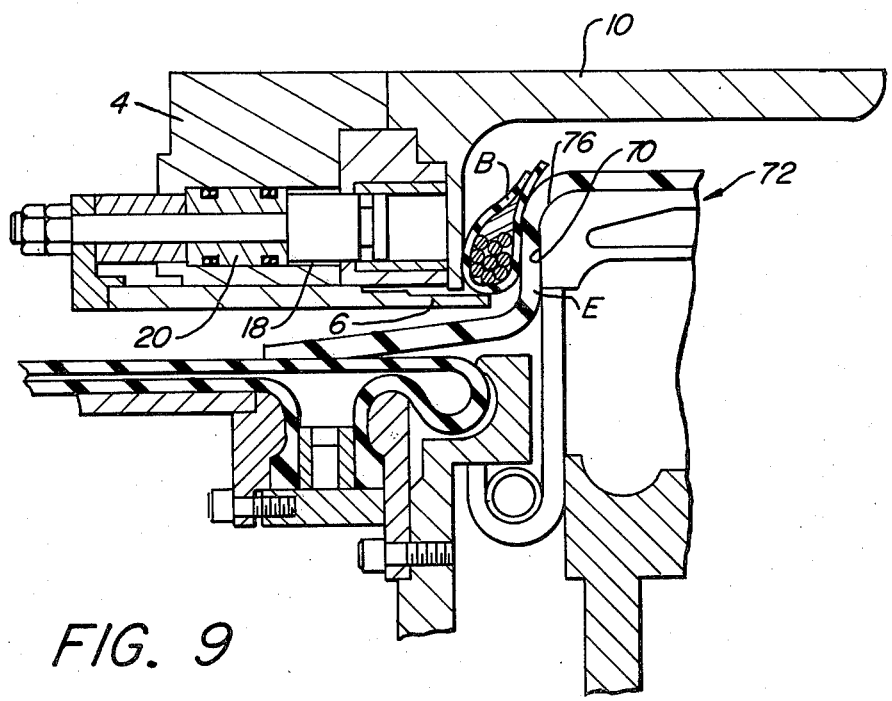

After expansion of building drum 72, the pressure in hydraulic cylinders 62 (FIG. 5) is released, and the pneumatic cylinder 56 moves the carrier member 4 to the position shown in FIG. 8. In this position, both the bead ring B and the support flange 6 are pressed against the carcass ply ends E, and the carcass ply ends E are in turn forced flush against the end face 70 of building drum 72. Under this pressure, the support flange 6 slides a short distance on the carrier member 4 axially away from the tire building drum 72. This causes the annular piston 20 to be forced back in chamber 18, in spite of the air pressure still supplied through the circumferentially spaced fittings 52 (FIG. 4). Because the support flange 6 retracts as the carrier member 4 presses the bead ring B against the carcass ply ends E, the bead ring B is squeezed between the front ring member 10 of the carrier member 4 and the carcass ply ends E. This causes the bead ring B to be firmly adhered to the tacky, uncured rubber of the carcass plies. Also, because the bead ring B is still fully supported at this point by the flange 6, the bead ring B is accurately positioned on the carcass plies.

While the carrier member 4 continues to press the bead ring B against the carcass plies, air pressure is introduced through line 50 while the passage in line 52 is vented to the atmosphere (FIG. 4). This moves the annular piston 20 all the way to the back of chamber 18, causing the flange 6 to retract to the position shown in FIG. 9. In this position the flange 6 will be barely, if at all, in contact with the bead ring B, and thus the hold that the carrier member 4 and flange 6 have on the bead ring B will be released. Put another way, the tacking force holding the bead ring B to the carcass plies on the building drum will be much greater than the frictional forces holding the bead ring B to the front ring member 10 and flange 6. Thus, when the carrier member 4 is moved back away from the building drum to the position shown in FIG. 10, the bead ring B will remain firmly in place on the carcass plies adjacent the end face 70 and shoulder 76 of the building drum 72.

Figure 10:
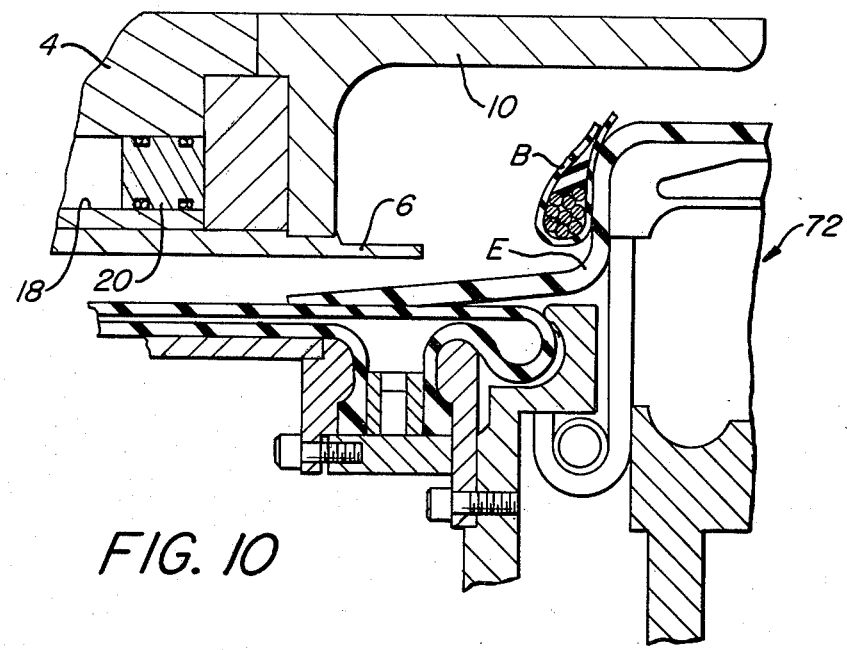
FIG. 10 is an enlarged sectional view of the bead setting apparatus of FIG. 1, taken along line 6—6 of FIG. 1, and showing the bead ring set on the carcass ply ends overhanging the shoulder of a tire building drum, and the bead setting apparatus in a retracted position.

When the carrier member 4 is withdrawn away from the building drum, as shown in FIG. 10, the flange 6 is returned to its original position by reversing the air pressures on the opposite sides of the piston 20 in chamber 18. The bead setting apparatus 2 is then ready to receive another bead ring for placement on the carcass plies of the next tire to be built on building drum 72.

While one embodiment of the present invention has been shown and described, modifications and other embodiments will of course be apparent to those skilled in the art, while remaining within the scope of the appended claims.

We claim:

1. An apparatus for setting a bead ring against the plies of a tire carcass overhanging the shoulder of a tire building drum, said apparatus including an annular carrier member encircling the axis of said tire building drum, a bead ring support flange encircling said building drum axis and mounted on said carrier member and extending axially from said carrier member toward said tire building drum shoulder, said bead ring support flange being axially slidable with respect to said carrier member, and means for moving said carrier member axially toward said tire building drum shoulder, characterized by:

a piston slidable in said axial direction within a chamber in said carrier member, a rod connecting said piston to said annular bead ring support flange, fluid pressure means connected to said chamber on the side of said piston facing away from said tire building drum shoulder for resiliently holding said bead ring support flange extending axially from said carrier member toward said tire building drum shoulder, and fluid pressure means connected to said chamber on the side of said piston facing said tire building drum shoulder for moving said piston axially away from said tire building drum shoulder.

2. The apparatus according to claim 1 wherein said chamber in said carrier member is in the shape of an annulus encircling said tire building drum axis, and said piston is also in the shape of an annulus and slides within said annulus-shaped chamber.

3. A method of setting a bead ring against the plies of a tire carcass overhanging the shoulder of a tire building drum, including the steps of carrying said bead ring on the support flange of a carrier member to a first position spaced axially from said building drum shoulder, then expanding said building drum with said carcass plies thereon, thereby causing the end portions of said carcass plies to be drawn around the drum facing edge of said support flange and toward the end face of said building drum, characterized by the steps of:

(1) moving said carrier member further toward said drum from said first position to press said bead ring and said support flange against said carcass ply end portions and also to press said carcass ply end portions against the end face of said building drum, while allowing said support flange to move axially with respect to said carrier member under the pressure of the engagement of said support flange with said carcass ply end portions;

(2) sliding said support flange on said carrier member axially away from said tire building drum to release the hold that said carrier member and support flange have on said bead ring, and (3) then moving said carrier member axially away from said tire building drum, leaving said bead ring pressed against said end portions of said carcass plies overhanging said building drum shoulder.

* * * * *